United States Patent [19]

LaCasse

[11] Patent Number: 5,217,778
[45] Date of Patent: Jun. 8, 1993

[54] COMPOSITE FIBER FRICTION FACING

[75] Inventor: Gregory J. LaCasse, Lancaster, Pa.

[73] Assignee: Raymark Industries, Inc., Trumbull, Conn.

[21] Appl. No.: 435,450

[22] Filed: Oct. 21, 1982

[51] Int. Cl.$^5$ ............................................. B32B 3/02
[52] U.S. Cl. ..................................... 428/64; 57/238; 57/240; 188/251 A; 192/107 M; 428/222; 428/283; 428/364; 428/371; 428/372
[58] Field of Search .............. 192/107 M; 188/251 A; 156/180; 428/37, 65, 228, 64, 222, 283, 364, 371, 372; 523/149, 156, 152; 57/238, 240

[56] References Cited

U.S. PATENT DOCUMENTS

| | | | |
|---|---|---|---|
| 2,855,081 | 10/1958 | Morton | 192/107 M |
| 2,901,388 | 8/1959 | Morton | 192/107 M |
| 3,429,766 | 2/1969 | Stormfeltz | 428/37 |
| 3,520,390 | 7/1970 | Bentz | 188/251 A X |
| 3,600,258 | 8/1971 | Morton | 428/65 |
| 4,118,528 | 10/1978 | Lowry | 192/107 M X |
| 4,244,994 | 1/1981 | Trainor et al. | 192/107 M X |
| 4,320,823 | 3/1982 | Covaleski | 192/107 M |
| 4,373,038 | 2/1983 | Moraw et al. | 523/156 |
| 4,374,211 | 2/1983 | Gallagher et al. | 523/156 |
| 4,384,640 | 5/1983 | Trainor et al. | 188/251 A X |
| 4,403,047 | 9/1983 | Albertson | 523/156 X |
| 4,418,115 | 11/1983 | Lannou | 523/156 X |

*Primary Examiner*—James J. Bell
*Attorney, Agent, or Firm*—Howson and Howson

[57] ABSTRACT

A dry clutch is prepared from a composite of fiber yarns, including fiberglass fibers and polymer fibers such as polyacrylonitrile fibers, which are blended together and twisted with wire. The yarns are shaped in a disc or other form and are bonded together with a heat curable binder system that includes an elastomer and a resin. The binder system also may contain organic and inorganic friction modifying particles.

10 Claims, No Drawings

COMPOSITE FIBER FRICTION FACING

BACKGROUND OF THE INVENTION

This invention relates to friction materials for motor vehicles and the like and more particularly to a novel material that may be used as a dry clutch facing.

The motor vehicle industry is constantly seeking improved friction materials having superior performance under demanding conditions, especially high temperature operation. When friction materials operate at high temperatures, they may wear excessively and prematurely. This is particularly true in the case of dry friction materials, such as clutch facings, which are mounted on a supporting member and are air cooled. With the increased use of front wheel drive trains, the problem of heat generation has become more prevalent.

SUMMARY OF THE INVENTION

The present invention provides a clutch facing that is relatively inexpensive to produce, but which has superior wear properties in comparison with similar facings made with asbestos or glass fibers alone.

Synthetic polymer fibers, preferably polyacrylonitrile fibers, are blended with glass fibers and metallic thread to produce a yarn. The yarn is treated with a solution of a heat curable binder system comprising elastomers and a heat curable resin, with the binder additionally including particulate organic and inorganic materials that serve to modify or enhance the final friction properties of the composite. The treated or coated yarn is then partially dried and formed into the desired shape, such as a disc. Pressure and heat are then applied to the disc to cure the resin and elastomer. The resulting composite comprises a matrix of the reinforcing yarn materials securely bonded together by the binder and having the friction modifying particles uniformly distributed therein. The friction facing has been found to have superior wear characteristics at elevated temperatures

DESCRIPTION OF THE PREFERRED EMBODIMENTS

The friction material of the present invention will be described in connection with dry clutch facings, although the compositions described herein are suitable for other uses, such as in connection with dry brakes and the like.

Generally, the present invention is a friction material comprising a blend of organic and inorganic fibers that are formed into yarns, and impregnated with a binder containing a heat curable elastomer, and resin, as well as friction modifying particles, as will be described more fully herein.

In terms of fiber content, the composition of the present invention comprises from about 3 to 5 percent and up to about 30 to 40 percent polymeric fibers selected from the group consisting of polyacrylonitrile (PAN), aramid fibers, rayon fibers and mixtures thereof. These fibers are all available commercially and have well known chemical compositions. Polyacrylonitrile or modacrylic fibers are preferred because they present fewer handling problems and provide certain performance advantages over other types of fibers. The preferred average fiber size of the PAN fibers is from about 1.5 to about 3.0 denier per filament.

The remainder of the fiber content comprises fiberglass, which is blended together with the polymer fibers to form a composite yarn. Preferably, the glass fibers in the yarn have an average diameter of from about 8 to about 18 microns.

In the preferred embodiment, the glass fibers are first fluffed with a high intensity air stream and are twisted together with thin metallic wire to form yarns or strands. Copper wire is preferred, although other soft metals may be used, such as brass or zinc. The wire diameter is preferably in the order of from about 0.006 to about 0.012 inches.

The wire-reinforced glass fiber yarn is then combined with the PAN fiber. Preferably, the PAN fiber is distributed or wound around a wire-glass fiber core by use of open spinning equipment, whereby the polymer fiber constitutes the outer layer, and the glass fiber constitutes the inner layer. The glass fiber thus contributes to and enhances the strength of the yarn without affecting the final frictional properties of the material.

Preferably, several yarns of the foregoing composite material are plied together by twisting the yarns together with additional wire. The final composite yarn will preferably contain from about 10 to about 50 percent polymer fibers, from about 30 to about 80 percent glass fibers, and from about 5 to about 35 percent wire, based on the total weight of the yarn materials.

Following preparation of the multi-ply composite yarns, they are impregnated and coated with a solution of a heat curable cement or binder system that also contains friction modifying particles uniformly distributed therein. The cement or binder may comprise heat curable elastomers, a heat curable resin, and preferably includes mixtures thereof. The elastomers may include styrenebutadiene (SBR) rubber, natural rubber, polychloroprene rubber and mixtures thereof. When neoprene rubber is employed, it is preferably employed with one of the other listed elastomers at a level of less than 50 percent by weight of the other elastomer. For example, when used in combination with SBR rubber, the neoprene preferably comprises from about 10 to about 50 percent of the total elastomer, or is present in an amount less than the amount of the other elastomer. Of the total dry weight of the cement solids and friction particles, from about 8 to about 25 percent comprises the elastomers.

The cement or binder also comprises from about 10 to about 20 percent of a heat curable polymeric resin, based on the total weight of the cement solids. The preferred resin is a conventional phenolic or phenol-formaldehyde resin, which provides good adhesion strength at low prices. Other types of suitable resins include resorcenal formaldehyde, phenol-cresol formaldehyde, phenol furfural, epoxy, epoxidized phenolic, melamine formaldehyde, and the like.

Finally, the binder comprises from about 50 to about 85 percent friction particles. "Friction particles" is a term commonly used in connection with friction materials and includes organic and inorganic materials that are added to enhance, reduce, or modify the frictional characteristics of the material, or to otherwise act as inert fillers. Suitable friction particles include, for example, carbon blacks, graphite, metal oxides, including magnesium oxide and alumina, barium sulfate, aluminum silicate, ground cured rubber particles, ground organic resins, polymerized cashew nut oil, clay, silica, cryolite and the like. These particles are preferably finer than 30 mesh, with the majority falling into the range of 30 to 325 mesh.

The uncured elastomer, uncured resin and friction parties are then dissolved in a suitable solvent to form a viscous cement having the friction particles substantially uniformly distributed therein. The solution may also contain conventional curatives, accelerators and the like to aid the curing of the rubber and resin. The solution will generally contain from about 30 to about 50 percent by weight cement solids. Standard solvents such as toluene and heptane may be used. The resulting solution is viscous and will penetrate, adhere to and coat the fiber yarns previously described.

In addition, up to about 5 percent by weight of the binder may comprise aramid fibers. It has been found that apart from the fiber content of the yarns, the inclusion of aramid fiber in the binder or cement significantly increases the properties of the final product.

The binder solution is then applied to the yarn, preferably in a continuous fashion, such that the yarn receives from about 45 to about 85 percent, and preferably from about 60 to about 70 percent, cement solids, and such that the yarn is substantially uniformly coated with the binder. Several yarns may be coated simultaneously by passing the yarn around a roller in a dip tank.

The coated yarn is then gently dried to less than six percent solvent, such as by passing the yarn through a circulating hot air or infrared oven. The heat applied, however, is not sufficient to cure the binder, and the resultant yarns are sufficiently tacky to adhere to one another.

A plurality of the coated and dried yarns, from 2 to 10 are then combined to form a tape by gathering the yarns on rotating rollers, which also serve to ply the yarns. The tape is then formed into the desired approximate preform or shape, such as a disc.

One method of assembling and forming the tape is to wind the tape in an undulating, overlapping or intersecting fashion into a revolving mandrel in such a manner that in the resulting preform the convolutions of the tape vary in the instantaneous radius at which they are being wound, such as is illustrated in U.S. Pat. No. 4,244,994 and No. 4,118,528. Other suitable methods may also be employed, such as spiral winding, or the yarns may be knitted, woven or formed into laminates. The overall objective is to provide a form in which the coated yarns are substantially uniformly distributed, and which the yarns or tapes overlap to enhance the integrity of the structure.

The resulting preform, which may be in the shape of a disc is then placed in a mold, i.e., a disc-shaped mold, and is preheated at a temperature of from about 350° to about 375° F. and at pressures of from about 3500 to about 5000 psi for a short period of time, such as 1 to 5 minutes, in order to compress and densify the material while removing any substantial voids. This operation causes the binder to at least partially cure and causes the friction member to assume the required final approximate dimensions as dictated by the size and shape of the mold. Subsequently, the friction members are removed from the mold and post-cured at higher temperatures, such as from about 400° to about 450° F. for a period of up to several hours. The subsequent heating serves to completely cure the resin and vulcanize the rubber, whereby the binder becomes infusible and insoluble.

The friction members, which may for example be in the form of clutch facings, may then be subjected to conventional finishing operations. For example, the facing may be ground to the desired final tolerances, and holes may be drilled in the facing to receive appropriate fasteners for attachment in the drive chain of an engine.

The resulting friction material, when used as a clutch facing, exhibits improved durability over previously known clutch facings of the highest quality. Particularly in the case where PAN fibers are employed, it is believed that during curing or subsequent use, the fiber layer adjacent the working surface is at least partially thermally degraded, and the organic fibers are converted into more heat resistant carbon fibers. Since the polymer fibers are uniformly distributed throughout the thickness of the facing, the carbonizing process may continue throughout the useful life of the material.

In summary, it may be seen that the working surface of the friction facing of the present invention comprises exposed PAN fibers reinforced internally with glass fibers, said fibers being in the form of intersecting yarns that provide a matrix which is adhered together by and filled with an organic binder containing friction particles. At least some of the exposed PAN fibers may be carbonized. The resulting material has a coefficient of friction of from about 0.22 to about 0.44 and has a greatly improved service life in comparison with prior materials without sacrifice as to burst strength or other desirable properties.

The following Examples further illustrate the present invention and the advantages and benefits thereof.

EXAMPLE I

The following compositions are illustrative of the present invention, expressed in percentages of weight based on the total dry weight of the material

|  |  | A | B | C | D |
|---|---|---|---|---|---|
| YARN | PAN FIBER | 10.00 | 10.00 | 5.00 | 5.00 |
|  | Glass Fiber | 20.00 | 20.00 | 25.00 | 30.00 |
|  | Wire | 10.00 | 10.00 | 10.00 | 5.00 |
| BINDER | Phenolic Resin | 13.20 | 7.56 | 12.06 | 11.20 |
|  | SBR Rubber | 5.10 | 9.54 | 9.42 | — |
|  | Neoprene | 5.10 | 1.02 | — | — |
|  | Natural Rubber | — | — | — | 8.70 |
| FILLERS | Barium Sulfate | 8.70 | 7.56 | 6.72 | 6.30 |
|  | Carbon | 7.20 | 8.58 | 7.68 | 7.10 |
|  | Clay | 7.20 | 7.56 | 6.72 | 6.30 |
|  | Metal Oxides | 4.50 | 8.40 | 5.40 | 8.00 |
|  | Cashew | 2.50 | 4.80 | 3.24 | 3.00 |
|  | Aramid Fibers | .50 | — | — | — |
|  | Rubber Particles | — | — | 2.88 | 2.50 |
| CURATIVES |  | 6.00 | 4.92 | 5.88 | 6.90 |

For the sake of comparison, the following compositions were prepared, based on conventional formulations used in the prior art.

EXAMPLE II

| Asbestos Based Material | | |
|---|---|---|
| YARN | Asbestos | 24.00 |
|  | Wire | 8.00 |
|  | Cotton Carrier | 8.00 |
| CEMENT | SBR Rubber | 5.50 |
|  | Phenolic Resin | 10.10 |
| FILLERS | Barium Sulfate | 21.60 |
|  | Lead | 16.40 |
|  | Graphite | 1.30 |
|  | Process Aids | .90 |
| CURATIVES |  | 4.20 |

EXAMPLE III

| Glass Fiber Based Material | | |
|---|---|---|
| YARN | Glass Fiber | 30.00 |
|  | Wire | 10.00 |
| CEMENT | SBR Rubber | 7.12 |
|  | Phenolic Resin | 7.85 |
| FILLERS | Barium Sulfate | 26.11 |
|  | Process Aids | 6.52 |
|  | Carbon | 2.71 |
|  | Graphite | 3.80 |
| CURATIVES |  | 5.89 |

Typically formulations from Example I were compared with formulations from Examples II and III in a wear test. The compositions were first identically processed into identical size clutch facings by similar procedures generally described herein.

The clutch facings of Examples I, II, and III were each subjected to the following test: Two clutch facings were riveted to a driven member. The mounted clutch facings were then installed on a fixed shaft of a dynamometer between a standard automotive flywheel and pressure plate. The flywheel and pressure plate were then rotated around the fixed clutch facing assembly at 1100 rpm. Provisions were made to apply pressure from the pressure plate to generate a torque as a result of the friction of the clutch facing. Every minute, one 4 second application of the pressure plate onto the clutch facing was made at a controlled torque level of 250 lb.-ft. For a complete test, 1200 of these type applications are made. The clutch facing was measured before and after testing and the wear of the facing was calculated from the difference of the before and after measurements. The facing wear is reported in thousandths of an inch.

TABLE I

| Clutch Facing Type | Clutch Facing Wear (in.) |
|---|---|
| Example I | 0.020 |
| Example II | 0.060 |
| Example III | 0.050 |

The foregoing results indicate that the clutch facing material of the present invention is significantly superior in wear qualities when compared to prior conventional asbestos or non-asbestos clutch facings.

I claim:

1. A dry clutch facing comprising a yarn component and a binder component for binding the yarn component together, said yarn component comprising, based on the weight of said yarn component, of from about 10 to about 50 polyacrylonitrile fiber, from about 30 to about 80 percent glass fibers, and from about 5 to about 35 percent wire, said polyacrylonitrile fiber being twisted around a central core of said glass fibers to form composite yarn, with a plurality of said yarns being twisted together with said wire, said binder component comprising, based on the weight of said component, of from about 8 to about 25 percent elastomer, from about 10 to about 25 percent resin, and from about 50 about 85 percent friction particles, said yarn being coated with said binder and arranged in an undulating intersecting fashion, said binder being present at a level of from about 45 to about 85 percent, based on the total weight of the clutch facing, said clutch facing being free of asbestos.

2. The clutch facing of claim 1 wherein said binder component comprises ground cured rubber particles.

3. The clutch facing of claim 1 wherein said binder component comprises aramid fibers.

4. The clutch facing of claim 1 wherein said binder component comprises up to about 5 percent aramid fibers.

5. The friction material of claim 2 wherein the polyacrylonitrile fibers are partially carbonized.

6. In a friction element adapted for use in a clutch, said friction element comprising fiber strands impregnated with a binder resin composition and disposed in an undulating fashion and then cured to form a disc-shaped facing, the improvement wherein said fiber strands are in the form of a plied yarn comprising from about 30 to about 70 wt. % glass fiber, from about 15 to about 25 wt. % acrylic fiber and from about 5 to about 35 wt. % metallic filament.

7. In the friction element of claim 6 the improvement wherein said plied yarn comprises a plurality of twisted yarns, said twisted yarns having a helical twist and said plied yarn having a helical twist opposite in direction of the twist direction of the twisted yarns.

8. In the friction element of claim 6, the improvement wherein said plied yarn comprises at least two twisted yarns having a helical twist and at least one copper wire, said plied yarn having a helical twist opposite in direction to the twist direction of the twisted yarns.

9. A plied yarn adapted for use in the manufacture of friction elements, said plied yarn comprising from about 30 to about 70 wt. % glass fiber, from about 15 to about 25 wt. % acrylic fiber and from about 5 to about 35 wt. % metallic filament, wherein said plied yarn having a helical twist and comprising a plurality of twisted yarns having a helical twist opposite in direction to the twist direction of the plied yarn.

10. The plied yarn of claim 9 comprising at least two twisted yarns and at least one copper wire.

* * * * *